United States Patent
Fassett, Jr.

(10) Patent No.: US 6,532,481 B1
(45) Date of Patent: Mar. 11, 2003

(54) PRODUCT IDENTIFIER, CATALOG AND LOCATOR SYSTEM AND METHOD

(76) Inventor: George C. Fassett, Jr., 7405 Laurelhill Ct. South, Fort Worth, TX (US) 76133

( * ) Notice: Subject to any disclaimer, the term of this patent is extended or adjusted under 35 U.S.C. 154(b) by 0 days.

(21) Appl. No.: 09/539,366

(22) Filed: Mar. 31, 2000

(51) Int. Cl.$^7$ .......................... G06F 12/00; G06F 17/30; G06F 7/00
(52) U.S. Cl. ...................................... 707/203; 707/102
(58) Field of Search ................................ 707/100, 101, 707/102, 200, 2, 4, 203, 10, 104, 9, 540; 705/27; 717/11, 172

(56) References Cited

U.S. PATENT DOCUMENTS

| | | | | |
|---|---|---|---|---|
| 5,708,780 | A | | 1/1998 | Levergood et al. ..... 395/200.12 |
| 5,715,314 | A | | 2/1998 | Payen et al. ................... 380/24 |
| 5,748,954 | A | * | 5/1998 | Mauldin ....................... 707/10 |
| 5,765,169 | A | * | 6/1998 | Conner ........................ 707/200 |
| 5,774,870 | A | | 6/1998 | Storey .......................... 705/14 |
| 5,794,207 | A | | 8/1998 | Walker et al. .................. 705/23 |
| 5,794,210 | A | | 8/1998 | Goldhaber et al. ............ 705/14 |
| 5,913,210 | A | * | 6/1999 | Call ............................... 707/4 |
| 5,918,214 | A | * | 6/1999 | Perkowski .................... 705/27 |
| 6,041,324 | A | * | 3/2000 | Earl et al. ...................... 707/10 |
| 6,092,069 | A | * | 7/2000 | Johnson et al. ................. 705/1 |
| 6,154,738 | A | * | 11/2000 | Call ............................... 707/4 |
| 6,199,204 | B1 | * | 3/2001 | Donohue ...................... 705/59 |
| 6,249,782 | B1 | * | 6/2001 | Day ............................... 707/2 |
| 6,279,018 | B1 | * | 8/2001 | Kudrolli et al. ................ 704/1 |
| 6,286,013 | B1 | * | 9/2001 | Reynolds et al. ............ 707/200 |
| 6,351,753 | B1 | * | 2/2002 | Jagadish et al. ............ 707/200 |
| 6,389,427 | B1 | * | 5/2002 | Faulkner .................. 707/104.1 |
| 6,389,592 | B1 | * | 5/2002 | Ayres et al. ................... 707/10 |

OTHER PUBLICATIONS

Gene H. Kim and Eugene H. Spafford (1994), The design and implementation of Tripwire: a file system integrity checker, pp. 18–29.*
Ellis S. Cohen (1988), version management in Gypsy, pp 201–215.*
Tapani Kilpi (1998), improve software product management process: implementation of a product support system, pp. 3–12.*

* cited by examiner

*Primary Examiner*—Safet Metjahic
*Assistant Examiner*—Merilyn P. Nguyen
(74) *Attorney, Agent, or Firm*—Guy V. Manning

(57) ABSTRACT

A key code generating engine strips extenders and other unwanted characters from a file or product name, truncates the remainder to a set maximum, appends the result to an identifier and provides a version suffix. The key code then is associated with other information about the file or product, such as a description, version, size, and a location identifier such as an address, telephone number or Internet web site URL. The resulting record is collated into a plurality of databases accessible through the Internet and searchable by key code or boolean keyword strings to locate files for downloading or vendors' web pages for ordering or learning more about a product. Multiple database systems segregated by subject matter can provide users a virtual card catalog of products and their respective upgrades, patches and add-ons. The key code, when applied to physical products instead of files, also can provide means for researching availability and ordering such physical products and accessories through alternative supplier inventory schemes.

23 Claims, 13 Drawing Sheets

Flow Chart - Key Generation

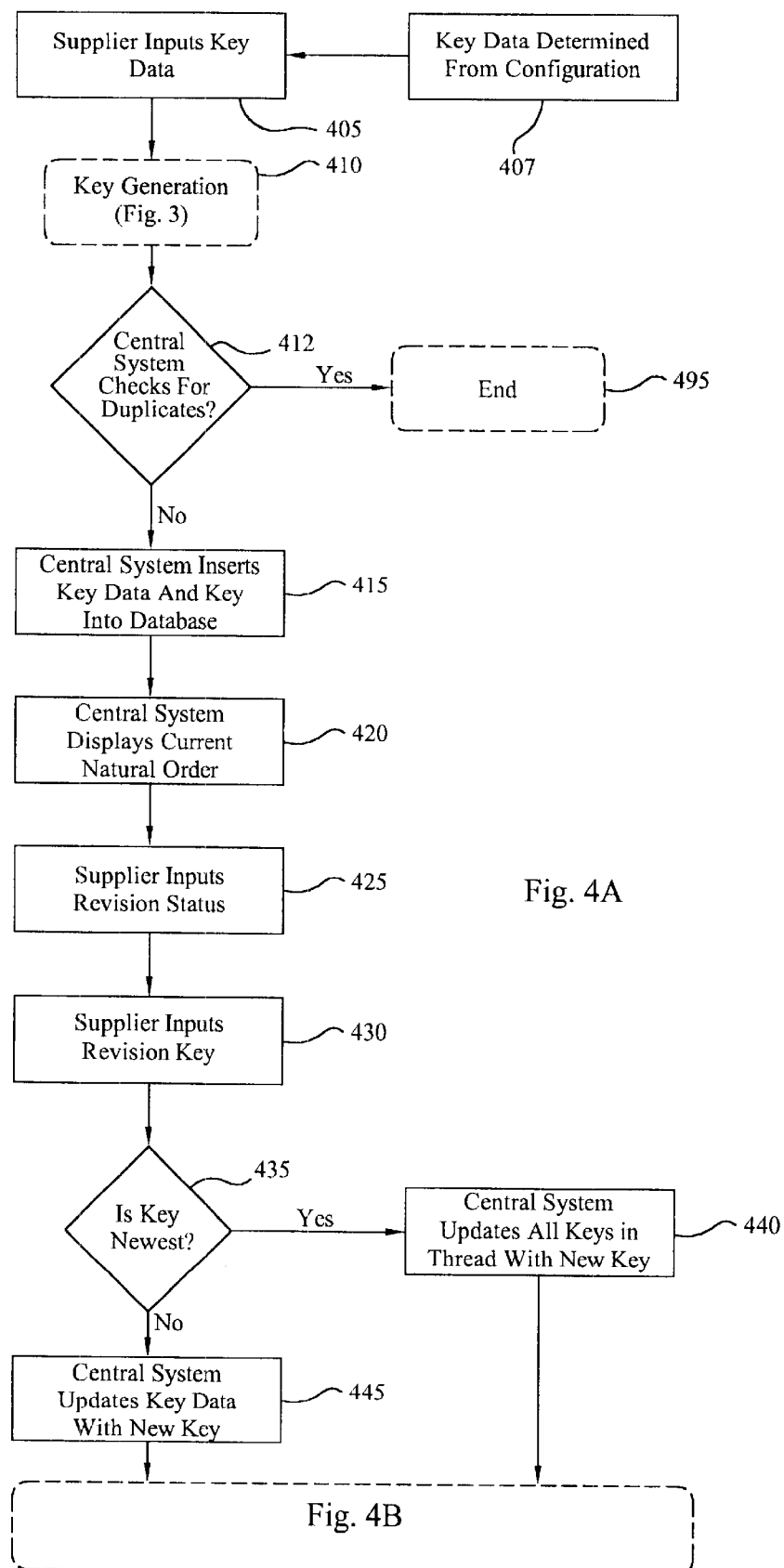

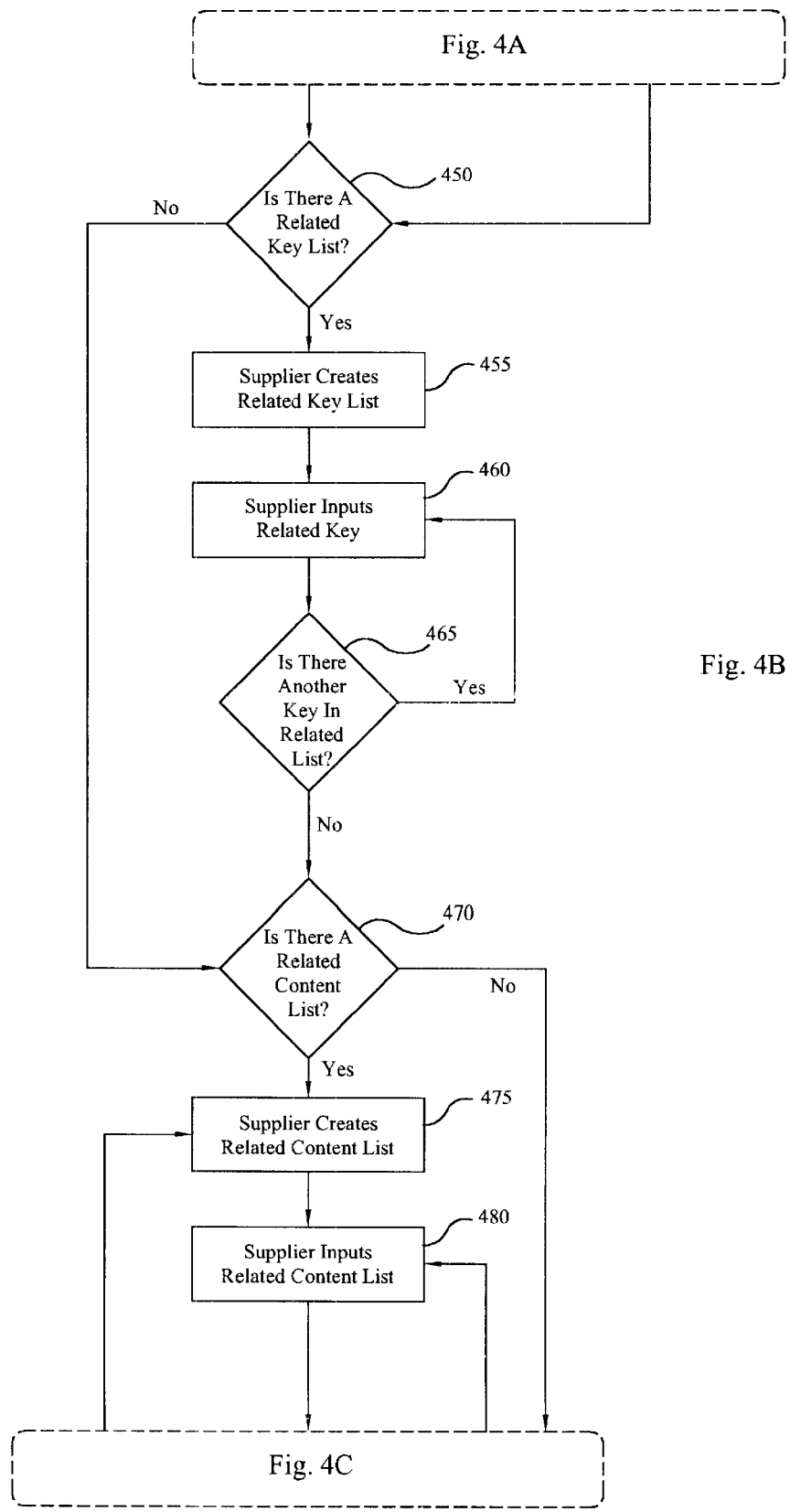

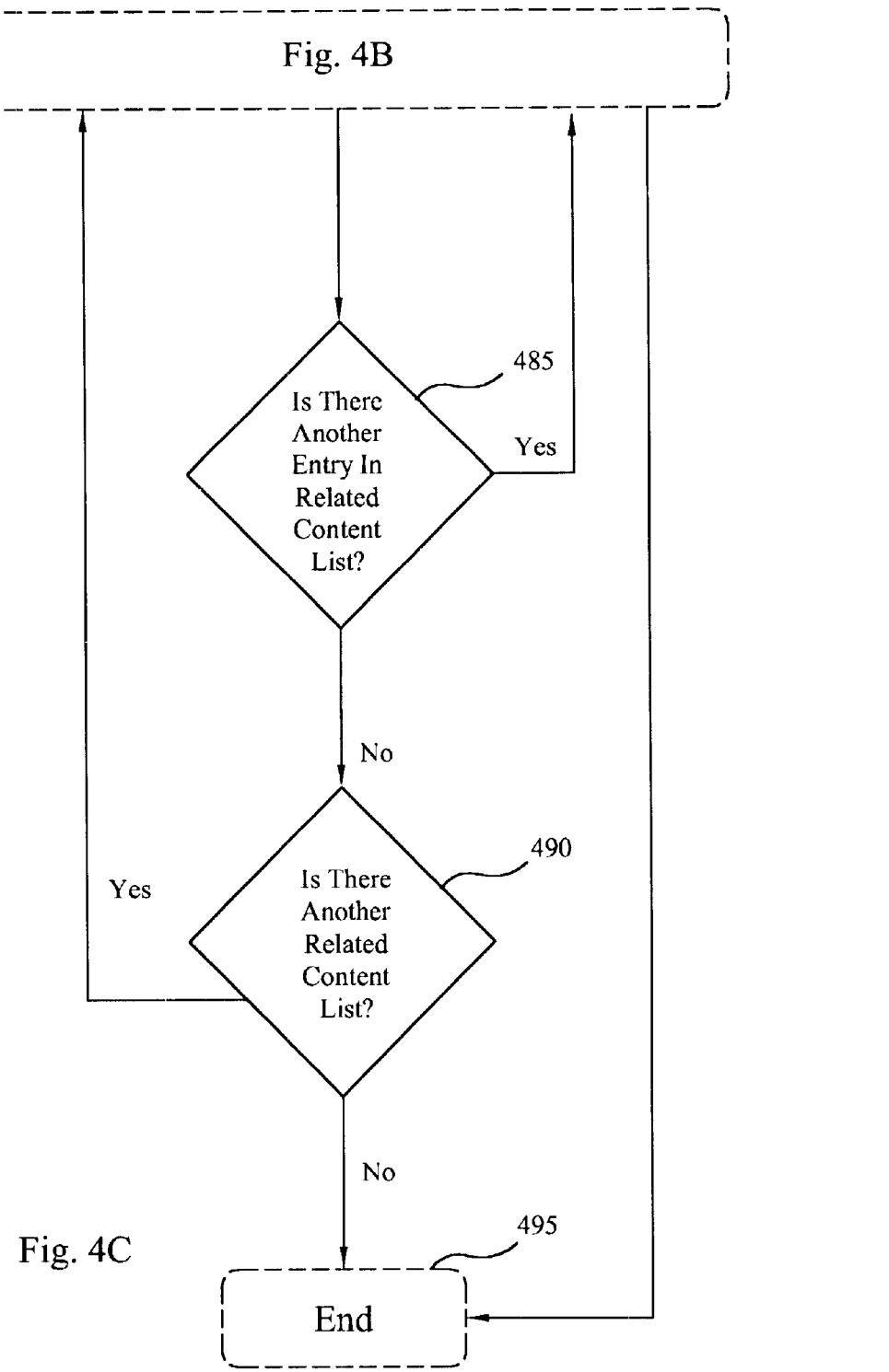

Flow Chart - Search by Catalog

Flow Chart - Keypage

PRODUCT IDENTIFIER, CATALOG AND LOCATOR SYSTEM AND METHOD

BACKGROUND OF THE INVENTION

1. Field of the Invention

This invention relates generally to computerized indexing systems, and particularly to computer file and product indexing. Still more particularly, this invention relates to a database controller which catalogs a file or product's existence, version and location using a unique key code, generated automatically; provides means for searching for the product by the key code, boolean keyword strings or catalog topics; and provides means for interconnecting the searcher with a custodian or supplier of the file or product.

2. Description of Related Art

Computer application programs fast become obsolescent. Publishers' post-publication improvements and error correcting "patches" usually reach users only through retail, direct mail or from publisher-maintained Internet web sites. Third parties, including both after-market suppliers and individuals with programming interest, likewise privately publish hard-to-find improvements and patches even after the original publishers go out of business or discontinue a program. A need exists for a comprehensive catalog of such files, identifying improvements and supplying information about improvements and current locations for obtaining them.

Particularly where third parties make improvements, naming conventions for files containing them can be less than illuminating. Further, file names often contain any number of non-alphabetic characters which may tell the programmer exactly what the file contains, but which are incomprehensible to others. A cataloging system of improvements which included a logically derived key code tying improvement files to an original program would prove useful.

Beyond the computer program context, suppliers of other products commonly employ automated inventory programs that track physical products by proprietary inventory product code numbers. Such product numbers seldom are standardized between industries, however, or even between suppliers within a given industry. The result, especially over time, is a myriad of numbering schemes and ad hoc cross references between suppliers that necessitates tracing a product number to a new or different supplier's inventory system to obtain the correct product. A need exists for a standardized product labeling system common to all inventory programs, permitting immediate access to all suppliers offering replacement, substitute or comparable products.

Upgrades to physical products can present a particular problem. Sometimes one supplier's replacement for another's product changes its specifications. Though the replacement will work, it may require accessories or adapters where the original equipment did not. In that supplier's inventory scheme, such accessories may or may not indicate association with the primary product. A need exists for a product numbering code which threads products to upgraded and related products.

SUMMARY OF THE INVENTION

Accordingly, it is an object of this invention to provide a file cataloging system which creates a central location for finding myriad variations, improvements, patches and upgrades to previously published computer programs.

It is another object of this invention to provide a key code for each catalog entry which identifies a computer file with other files to which it is related.

It is yet another object of this invention to provide a system and method of generating a key code from a file name.

It is yet another object of this invention to provide a system and method for tracing products through the inventory systems of various alternative suppliers despite their proprietary numbering schemes.

It is yet another object of the present invention to thread related key codes through a central controller system for ease of locating and obtaining associated products.

The foregoing and other objects of this invention are achieved by providing a key code generating engine which strips extenders and other unwanted characters from a product name, truncates the remainder to a set maximum, appends the result to a product identifier and provides a version suffix. The key code then is associated with other information about the file or product, such as a description, version, size, and a location identifier such as an address, telephone number or Internet web site URL. The resulting record is collated into a plurality of databases accessible through the Internet and searchable by key code or boolean keyword strings to locate files for downloading or vendors' web pages for ordering or learning more about a product. Multiple database systems segregated by subject matter can provide users a virtual card catalog of products and their respective upgrades, patches and add-ons. The key code, when applied to physical products instead of files, also can provide means for researching availability and ordering such physical products and accessories through alternative supplier inventory schemes.

BRIEF DESCRIPTION OF THE DRAWINGS

The novel features believed characteristic of the present invention are set forth in the appended claims. The invention itself, however, as well as a preferred mode of use and further objects and advantages thereof, will best be understood by reference to the following detailed description of an illustrative embodiment when read in conjunction with the accompanying drawings, wherein:

FIGS. 4A through 4C show a flow chart describing procedures for threading like key codes together.

DETAILED DESCRIPTION OF A PREFERRED EMBODIMENT

Figure 1:
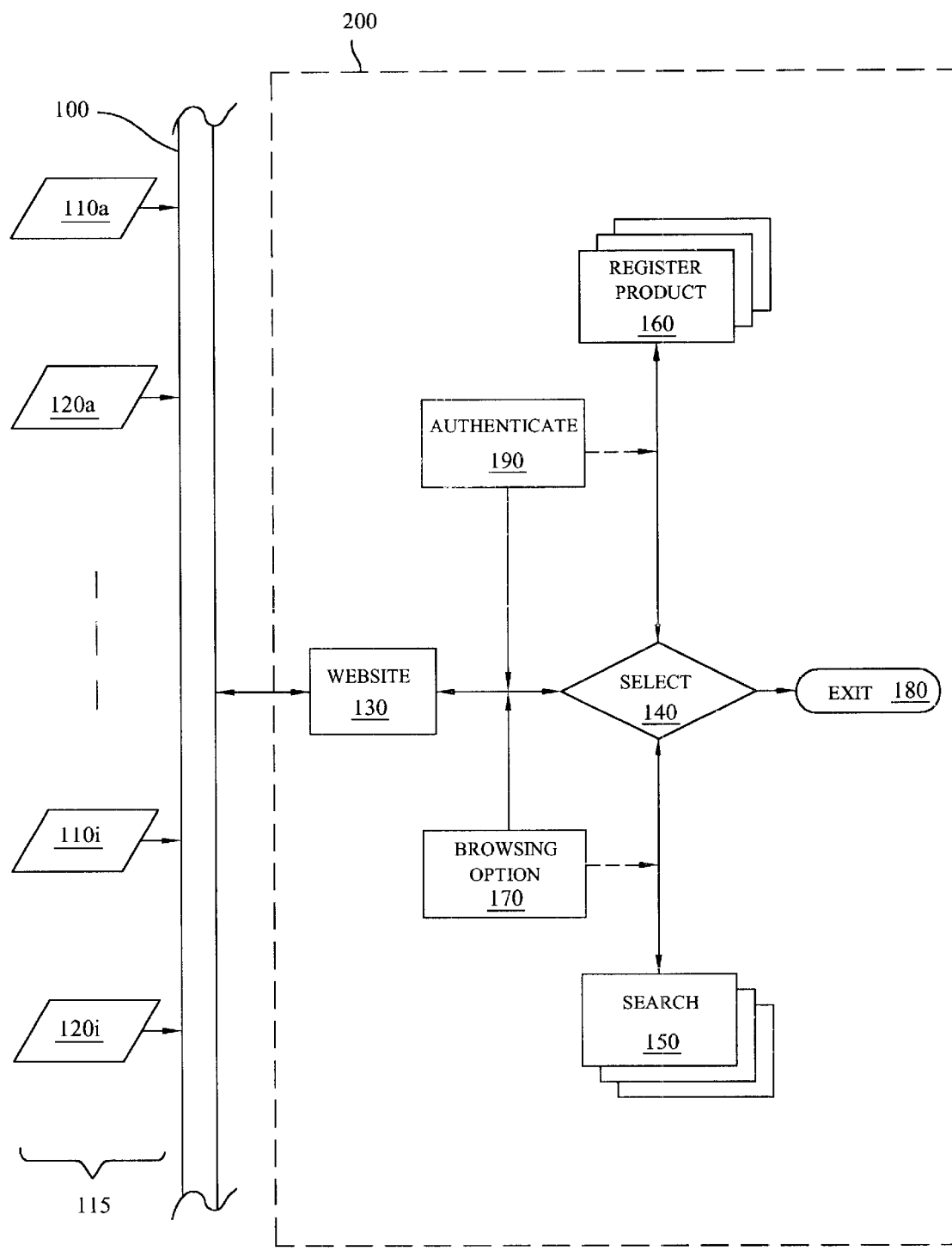
FIG. 1 depicts in schematic a network system whereby users and suppliers interconnect to a controller carrying out a preferred embodiment of the present invention.

With reference now to the figures, and particularly to FIG. 1, computer based network 100 interconnects users 110 and suppliers 120 to central controller 200 charged with management of the present invention. Central controller 200 is adapted for access by both suppliers 120 and users 110 (collectively hereinafter "accessors" 115). Each accessor 115 first encounters web page 130 adapted to greet and to determine accessor 115's authority for activity on controller 200. Suppliers 120 typically register new products (hereinafter the terms "products" and "files" are used interchangeably unless inappropriate in context) using registration procedures 160, while users 110 more typically seek product information and search for products using search procedures 150. Both procedures are discussed in detail below.

Controller 200 may include authentication procedures 190 for regulating the activities of accessors 115. A routine (not shown) for registering and obtaining membership, whether or not at a fee, may be established for accessors 115 first entering controller 200 before they reach selection step 140. Such routine may be one of several known routines commonly available. Such routine may also include designation of different levels of authority to carry out different steps in the invention. For example, suppliers 120 likely will have a higher level of authority, giving them the ability to edit products they previously registered, whereas users 110 would have only searching capabilities.

It should be noted here that accessor 115 may backtrack at any point in the program, including returning to selection menu 140 from any other location in the program. It will be appreciated henceforth that this feature is available to all steps in the program without being discussed further herein. It also will be appreciated that accessor 115 may be presented with various browsing options 170 either at initial entry to web page 130 or upon selection (dashed lines in FIG. 1) of registration menu 160 or search menu 150. Browsing options may include alternative browsing menu configurations, non-graphical user interfaces or the like.

Network 100 preferably comprises what is generally known as the "world wide web" or the "Internet," but one having ordinary skill in the art will recognize that network 100 could be an intranet, wide area network or local area network, without departing from the spirit and scope of the present invention. Typically, accessors 115 and controller 200 access network 100 by known means appropriate for the type of network 100. For example, where network 100 is the Internet, access occurs either directly by modem interconnection through an Internet Service Provider ("ISP") (not shown) or through a proprietary network such as America Online, CompuServe or the like (not shown).

Navigation over the Internet commonly is achieved by one of a variety of browser software packages adapted to render transparent differences between types of individual computers. This is achieved by the browser software being capable of interpreting hypertext transfer protocol (http) routing signals and hypertext management language (HTML) encoding for graphical user interface displays on computer monitors. Typically, a vendor, supplier or the like creates a web page HTML index file on a server accessible from the Internet using a unique electronic address called a uniform resource locator (URL). Accessors 115 call the URL from their network access computers, and the web page directs their browser software to the HTML index file which displays a graphical user interface ("GUI", or "menu") of the web page owner's design on accessor 115's computer monitor. Alternately, GUI's may be created by application software which, rather than relying on browsers and HTML, communicates through Internet sockets directly with complementary applications elsewhere. In either case, the GUI may be designed to be interactive, whereby accessor 115 is requested to make selections by, e.g., clicking a mouse pointer on certain buttons displayed on the web page.

It will be further understood here that access to controller 200 may be had by other means than network 100 if allowed by controller 200, such as by a computer terminal coupled directly to controller 200 (not shown). This may be of particular use early in the development of any given controller 200 system while databases are being established and access and linking protocols and editing authority and general security standards are being developed. For example, manual entry of data, particularly product registration 160 entries, will be required while automated entry menus are being developed. As such, it will be understood that any known manual methods of accomplishing what is herein described as automated will be considered to be within the spirit and scope of the present invention.

Figure 2A:
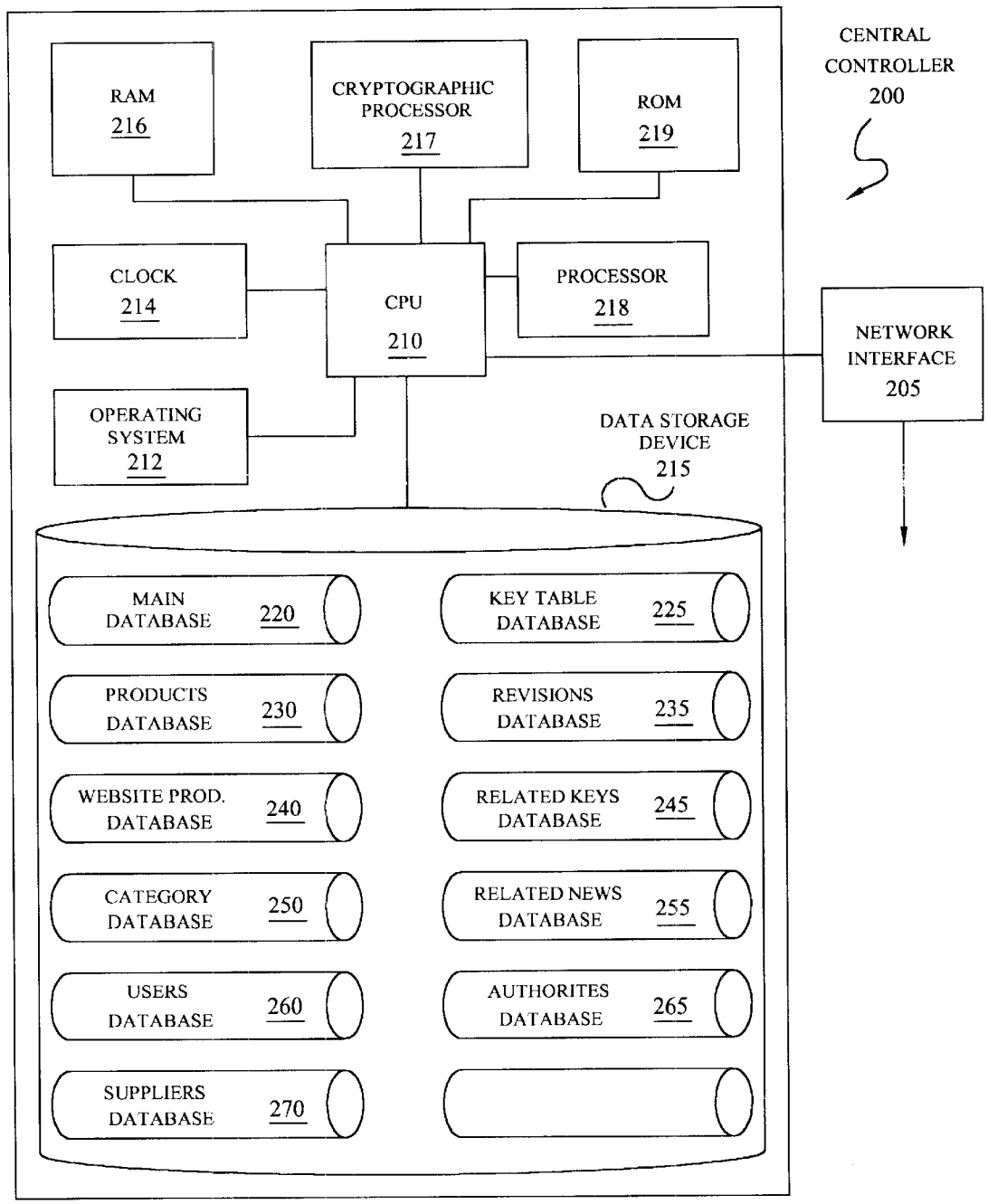
FIGS. 2A and 2B describe the hardware and database configurations of a preferred embodiment of the present invention.

Referring now to FIG. 2A, central controller 200 couples to network 100 through network interface 205 and comprises what is generally understood to be a server computer having central processing unit (CPU) 210 programmable to carry out the present invention, operating system 212 for management of CPU 210, clock 214, random access memory (RAM) 216 for temporary storage, read-only memory (ROM) 219, and one or more data storage devices 215 for permanent data storage. Central controller 200 must be capable of processing a high number of transactions and performing a substantial number of mathematical calculations while performing the requirements of the invention. A suitable CPU 210 is an Intel Pentium II microprocessor having a clock speed of at least 300 megahertz (Mhz). Operating system 212 must be suitable for operation with CPU 210. A suitable operating system 212 for the Intel CPU 210 specified above is Unix/FreeBSD version 2.2.8, currently available free from the FreeBSD.Inc. of Gresham, Oreg.(www.freebsd.org). Minimum RAM for supporting operating system 212 using CPU 210 is 128 megabytes. Network interface 205 preferably is a 10 megabit per second base, twisted pair network adapter, or better, allowing communication with a broadband ISP; a suitable network interface is model 3C509-T available from 3Com Company of Santa Clara, Calif. Data storage device 215 is one of a variety of data storage devices widely available, and may include permanent media such as CDROM drives for certain database functions, hard disk magnetic or optical storage units or flash memory.

Resident on data storage device 215 are several primary databases used in processing the transactions of the present invention. The most significant of these appear in FIG. 2A and include main database 220, products database 230, website products database 240, category database 250, users database 260, suppliers database 270, product key table database 225, revisions database 235, related keys database 245, related news database 255 and authority database 265. A complete list of these and other databases which supplement the foregoing appears in chart 1 and is diagramed in FIG. 2B. Both are discussed further below.

Continuing with FIG. 2A, main database 220 comprises records constructed from information submitted by suppliers 120 upon registering products in step 160 (FIG. 1). At a minimum, each record in main database 220 includes the product name, description and a location where the product or more information about it may be obtained, said information also being associated in main database 220 with a key code developed in response to such submission. Development of the key code is discussed in detail below.

Products database 230 includes a list of products with associated identifiers used in development of the key code.

Website products database 240 provides a list of a vendor's products authorized to be displayed on a given website. Category database 250 associates products with categories searchable by topic and product name, as well as provides the basis for building of a site map and catalog of products by controller 200. User database 260 and supplier database 270 include information about persons who register to use the present invention, including access authority determined at step 190 (FIG. 1).

Product key table database 225, revisions database 235, related keys database 245, and related news database 255 all are constructed by the present invention from information provided by supplier 120. Product key table database 225 lists all current product key codes, while related keys database 245 associates each key code with others which may identify related products. Revisions database 235 associates key codes with predetermined next version numbers so that a subsequent product key code number is readily available. Related news database 255 associates each key code with a file in news database 275 (FIG. 2B) containing news about a product bearing that key code.

Figure 2B:
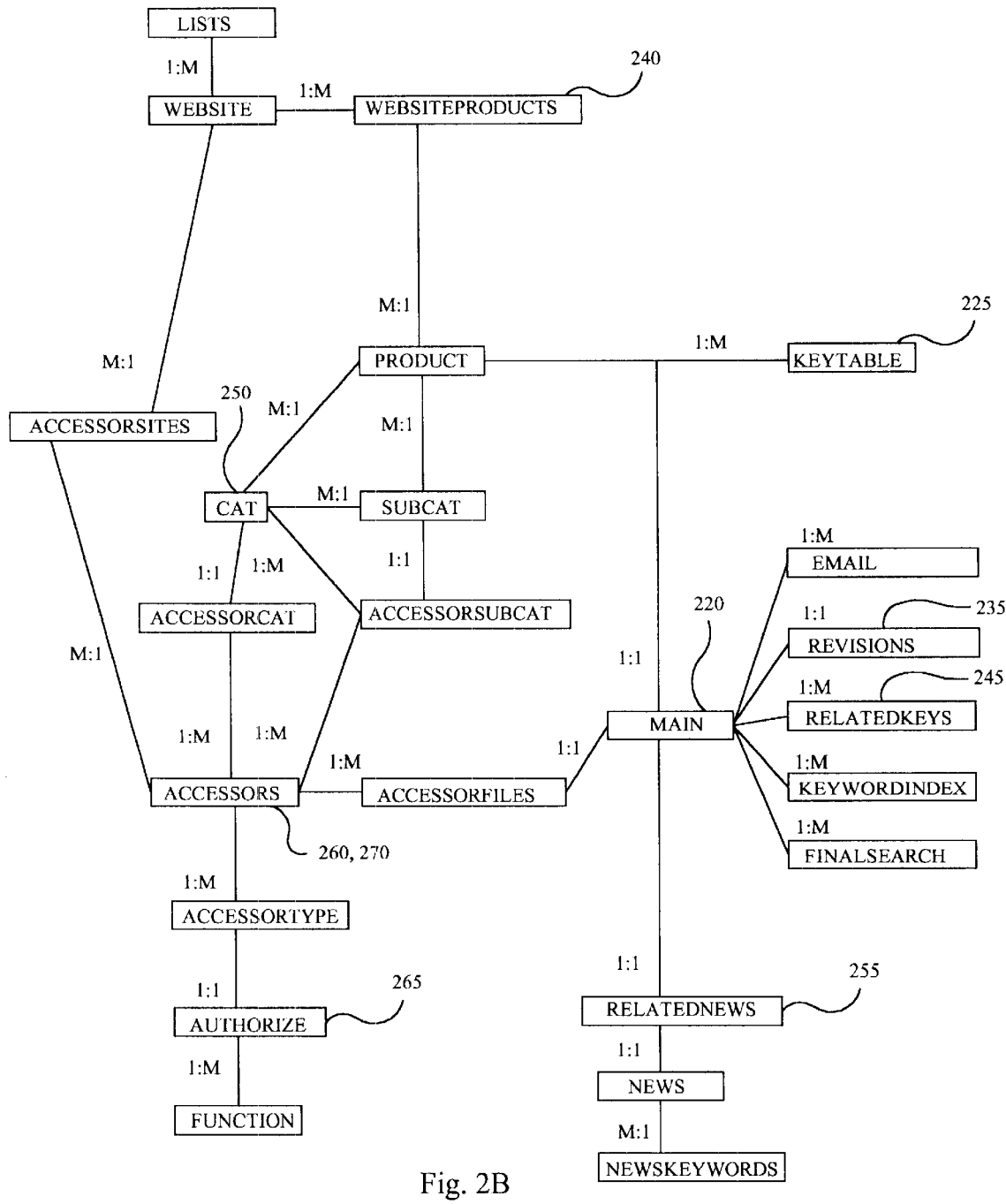

FIG. 2B illustrates a diagram of all databases typically required for the present invention. It illustrates which databases have common fields in their records, and includes encoding beside the links between such databases that signify the ratio of the number of records in each. Read from left to right and from top to bottom, the ratios indicate either "one to many" (1:M) or "many to one" (M:1), signifying that one database will have numerous records for each single record in the adjacent database. Chart 1 further defines the fields of each database displayed in FIG. 2B. Where Chart 1 uses the term "filekey," it means the unique key code generated as described herein. A field in Chart 1 labeled a "key" field in a database may be indexed, or searched, using that field by procedures relied upon by controller 200. One having ordinary skill in the art will recognize that the fields described in Chart 1 are by way of example and can be customized by supplier 120 for differing applications and purposes.

Product Registration

Product registration menu 160 provides procedures for registering a product, generating for it the unique key code (FIG. 3) and threading that key code to others for related products (FIGS. 4A–4C). The key code identifies the product and associates it with a record containing, at a minimum, a description and name for the product, a type identifier for the product, and a URL or other location, where the product or more information about it may be obtained. Registration 160 proceeds through a series of interactive menus (not shown) presented to supplier 120 who responds to inquiries with information entered in spaces provided. Controller 200 strips selected information entered by supplier 120 and houses it in appropriate fields in a record in main database 200. Said record will contain not only the information entered by supplier 120, but also a unique product key code generated partly automatically and partly interactively during registration session 160.

Development of Product Key Code

Figure 3:
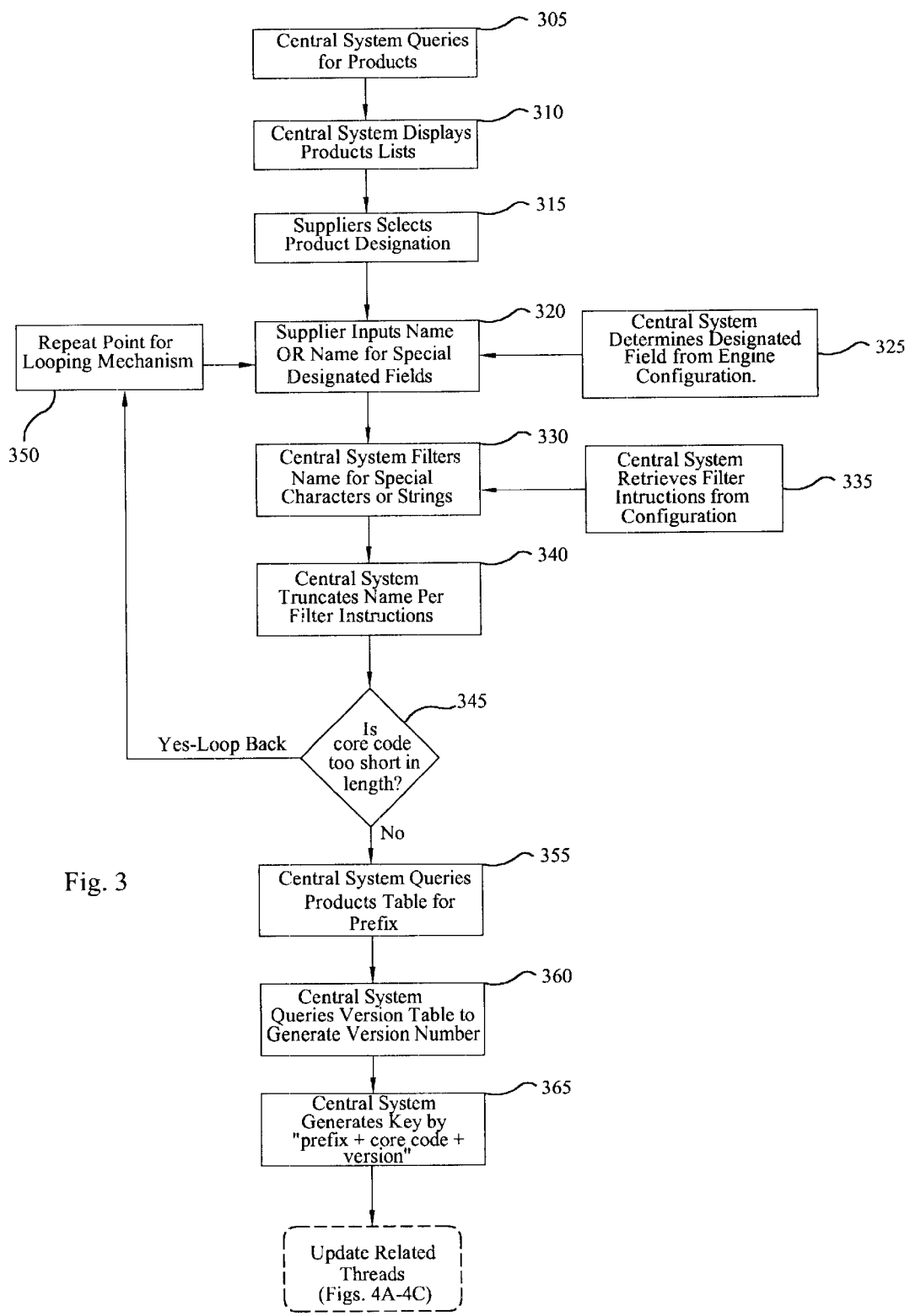
FIG. 3 shows a flow chart for development of a key code for a product.

Turning now to FIG. 3, the product key code is generated in three parts. It comprises a Prefix derived from the type of product, a Core Code preferably derived automatically from the name of the product, and a Version Number assigned by the system. Each component is developed separately and assembled as:

product identifier+core code+version number=product key code having the preferred form: "ppppp.uuuuuuu.vvv", where
p=product (prefix)
u=unique identifier (core code)
v=version (in base36 of 0–9,a–z)

Components may be separated by a delimiter (as shown above) which allows each to vary in length without affecting the readability of the key code as a whole, or they may be of fixed length, allowing the key code to be read with a template. In the latter case, fifteen characters is preferred, with proportions as illustrated above, delimiters being unnecessary. In the former case, the length of the key code may vary due to variations in the components. One having ordinary skill in the art will recognize that each component illustrated is arbitrary in both content and length, so that variations on the above fall within the spirit and scope of the invention.

The Prefix, or product identifier, is a cryptic but intelligible abbreviation derived from one product type. The product type and product identifier are associated in products database 230. The product type may be a vendor, such as Microsoft Corp. or DELCO, or it may be a line of products from a vendor, such as Microsoft Word (word processing software) or DELCO starters (auto parts). The product identifier (prefix) then is an intelligible abbreviation, such as "msw" or "msword" for a Microsoft Word document, or perhaps "dstart" or "delstart" for a DELCO starter. Though there is no theoretical limit on the number of characters in the product identifier, it must contain at least one character and, for simplicity and database efficiency, should include no more characters than necessary to render it at least minimally recognizable as associated with the product.

Continuing with FIG. 3, supplier 120 selects at step 140 registration menu 160. Central controller 200 then reads products database 230 at step 305, displays at step 310 a selection to supplier 120 and prompts supplier 120 to choose an existing product identifier or to suggest a new one. In the latter case, supplier 120 may be given criteria and a space where he is asked to formulate an identifier. Where supplier 120 prefers to suggest a new product identifier, controller 200 may automatically enter it into product database 230. Alternately, newly submitted product identifiers may be screened first, either automatically or by human intervention. In either case, registration step 315 accepts supplier 120's election and proceeds to compose the core code.

Supplier 120 next furnishes at step 320 a name for the product from which the core code is derived. It may be, e.g., the file name for a computer file, or the part number or name for a physical product such as an auto part. Such names, though having meaning to supplier 120, may be unintelligible to others because of punctuation, empty spaces and non-alphabetical characters (e.g.: –, +, –, 1234567890, [, ], {, }, etc..). For example, a Microsoft Word word processing document that included this patent application might be entitled "PatentPend-12-01-99.doc," whereas, a part number for a DELCO starter might appear as "S0064-2. 100#." Intuition might suggest the content of the word processing document to users 110, but the part number for most people would be meaningless. Nevertheless, product names typically used in industry often contain enough useable characters to make them useful. Alternately, user 110 may suggest a totally arbitrary name.

As seen in FIG. 3, controller 200 also includes filter instructions 335 as a guide in deriving the core code. Preferably, the core code generated by controller 200 contains at least one non-numeric character and no more than seven (7) characters in all. More preferably, all characters are alphabetic to maximize the likelihood of the core code being humanly intelligible. One having ordinary skill in the art will recognize that the preferred maximum number of characters specified is arbitrary and may be expanded or contracted as needed for the particular central controller or product system being developed.

Continuing the example above, filter 335 typically directs controller 200 to look first at the last (rightmost) character of the filename and work its way toward the first. Extraneous components such as the file extension "doc" of "PatentPend-12-01-99.doc." are discarded, leaving the string "PatentPend-12-01-99." Controller 200 next removes all non-alphabetical characters, leaving "PatentPend." Controller 200 then begins at the highest order (left-most) character and counts off character positions until it reaches the maximum designated by filter 335, truncating the remainder at step 340. In the example, "PatentPend" thereby becomes "PatentP." Finally, controller 200 converts all alphabetic characters to lower case, thereby reducing the original file name, "PatentPend-12-01-99.doc" to a core code of "patentp." Assuming the same filter 335 is used, the auto part number, "S0064-2. 100#" becomes "S" and then "s."

Filter 335 also includes criteria for a minimum core code size. A minimum of two (2) characters is preferred. At step 345, controller 200 contrasts the core code with filter 335's criteria and prompts supplier 120 for another name if the core code is too short. In the example, the core code "patentp" is sufficiently long, but the starter part core code number is too short. For the latter, supplier 120 would be prompted to supply another number. In response, he might insert another character into the original part number, such as a "D" for DELCO, rendering the part number "DS0064-2. 100#," which would become DS and then "ds" for the core code. In both cases, the prefix is added to the core code, resulting in "mswordpatentp" and "delstartds" respectively in the examples. The program then proceeds to assign the third component of the key code, a version number.

The version number is generated automatically. Controller 200 queries version table 360 to determine whether or not the prefix and core code combination already has been catalogued. If so, it determines the version number of the most recent version, increments it by one, assigns that value to the product key code in process, and updates version table 360 to reflect the increment. For storage efficiency, version table 360 preferably relies upon a base-36 counting system composed of the numerals 0–9 followed by the letters a through z. This allows a single digit in the version position to represent up to 36 versions before requiring a second digit. This has the effect of reducing the number of characters in any given product code. For example, if a given file submission was the 35$^{th}$ combination of a product prefix and a core code, the version number would be "z"; if it were the 46$^{th}$, the version number would be "1a." Assuming the latter for the examples, the product key, when assembled as:

product identifier+core code+version number=product key code becomes: "msword,"+"patentp,"+"1a"= "msword.patentp.1a" and "delstart,"+"ds,"+"1a"= "delstart.ds.1a", assuming that delimiters are used.

Threading

Turning now to FIGS. 4A, 4B and 4C, the process by which key codes are threaded to others is described. At step 405, controller 200 provides supplier 120 with a template 407 for the type(s) of product(s) supplier 120 is authorized to register. Supplier 120 then enters data about the product which eventually becomes the data appearing in main database 220, as described above. Certain data, namely the product name, is stripped at 410 and processed to generate a key code for the product (see FIG. 3 and discussion above). Once the key code is generated, it must be associated with other key codes to provide a user 110 with a history of the product, including upgrades, associated products and pertinent information about each.

Once the key code is generated 410, controller 200 scans keytable database 225 and displays a list of similar key codes to supplier 120. Controller 200 inquires 412 of supplier 120 if the product just registered duplicates any of those displayed or any others of which he is aware. If so, this is a redundant registration and must be discarded. The new key code and information are deleted and supplier 120 exits the registration process 495 back to main menu 130. If supplier 120 indicates he does not think the new key code represents a duplicate product, threading proceeds.

First, the new key code is inserted 415 into keytable database 225 and its record is inserted into main database 220. Controller 200 next displays 420 again for supplier 120 any natural order of related key codes it perceives from the new key code and asks supplier 120 if the product it represents is a revision to any earlier products. If supplier 120 responds 425 with yes, he is asked to identify 430 the key code for the product being revised, if it is displayed, and is given a space to input one if it is not. Next, controller 200 inquires 435 of supplier 120 whether or not the new key code is the latest version. If so, controller 200 updates 440 all other key code records in the same thread in revisions database 235 to reflect the addition of the new key code. If not, controller 200 associates 445 the new key code only with the records of all earlier key codes.

Next, controller 200 inquires 450 of supplier 120 if there are any other products related to the new key code's product. If so, supplier 120 confirms any appearing on a suggested list 455 and sequentially notes 460 any others until the list is complete. Next, controller 200 inquires 470 of supplier 120 whether or not one or more related content lists exist, and if so, gives supplier 120 a routine 480, 485, 490 to designate them one at a time. If not, threading is completed and supplier exits 495 the registration process, preferably returning to main menu 130 where he may register another product 160, search for a product 150, or exit the system 180.

Searching

Returning again to FIG. 1 as well as FIGS. 5 through 9, accessor 115, wishing to search for information about a product, logs onto controller 200 and obtains proper authority 190 (if necessary) to conduct a search as a user 110. When presented with selection step 140, user 110 selects search option 150 which presents menu 510 (FIG. 5), prompting him to select what type of search he wishes to conduct. User 110 selects one of three search options: key code searching 520, catalog (category) searching 530, or keyword (boolean) searching 540.

Figure 9:
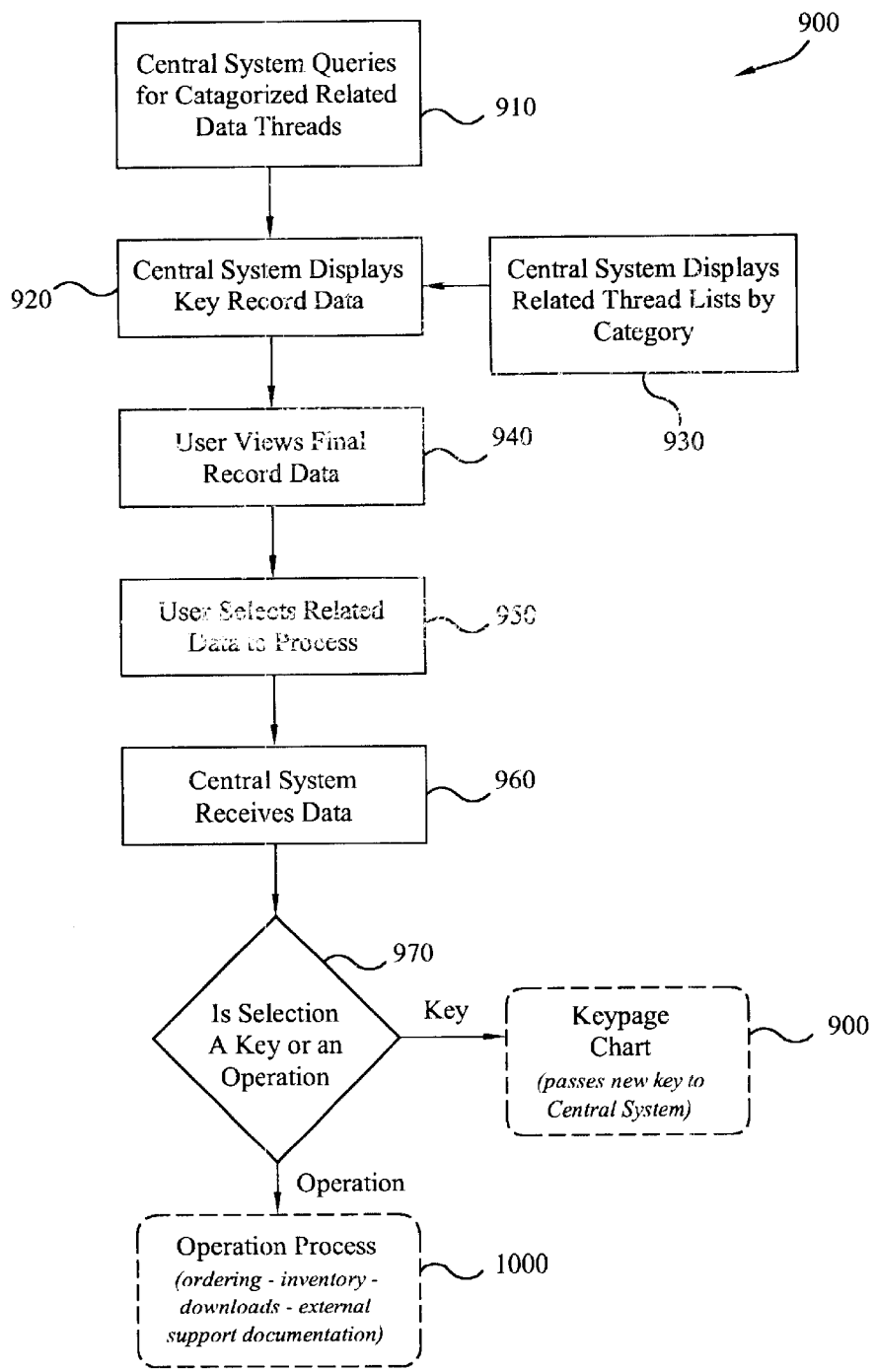
FIG. 9 shows the final presentation to a user after successful searching.

Having a product key code simplifies searching considerably. User 110 simply types in the key code at, step 610 (FIG. 6), typically in a menu space provided for the purpose, and central controller 200 returns at step 630 a selection of information for that key code. As seen in FIG. 9, such data includes threads to other information about related keys 910 and related categories 930, as defined by related keys 245 and revisions 235 databases (FIG. 2A). Controller 200 then offers user 110 at step 940 the option 970 to look at other key codes or categories 950, or to link to the vendor's URL 1000 for ordering, downloading or obtaining at additional information.

For example, a menu (not shown) may be presented with further selections as to news, related keys, related products and the like as contained in databases 230, 240, 245 and 255 (see FIG. 2A). One having ordinary skill in the art will recognize that such information may be presented in a variety of ways, such as sequential GUIs displaying links to additional GuIs with more information. Likewise, one such GUI may provide a link to a vendor's web site where the product itself may be obtained.

Figure 5:
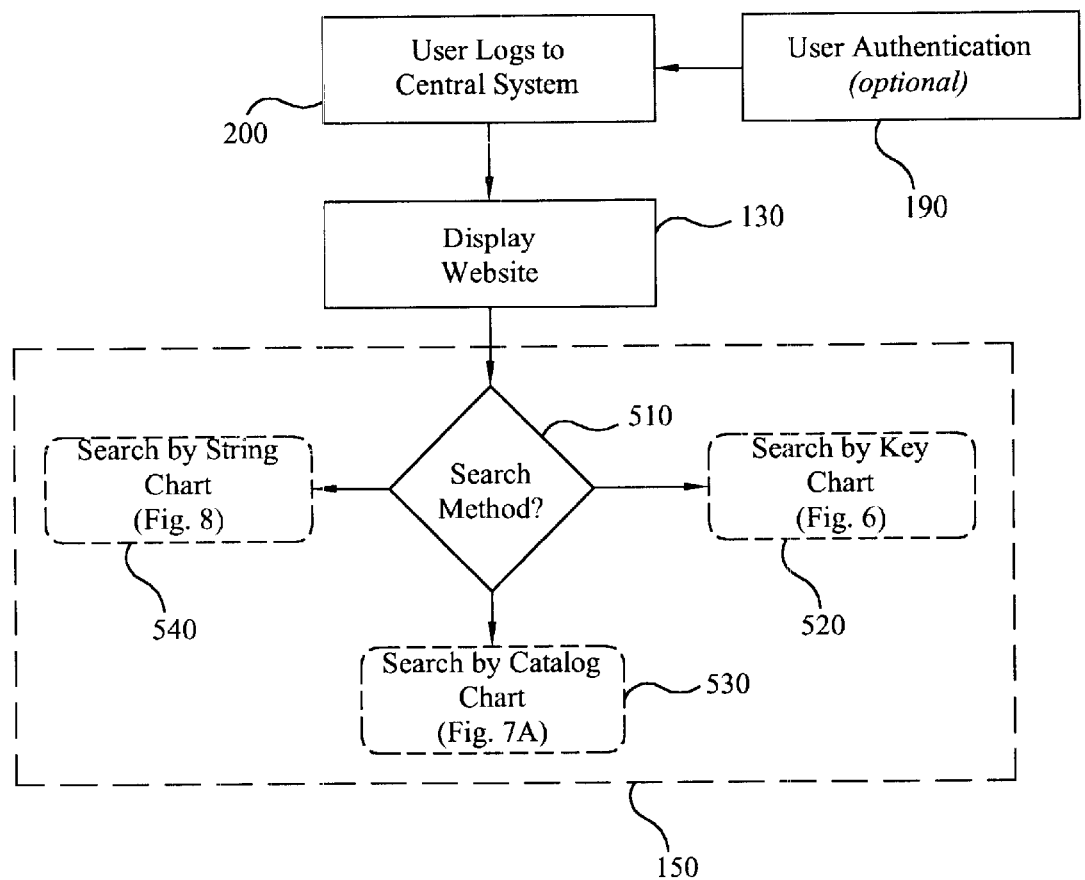
FIG. 5 illustrates searching choices presented to a user of the system of the present invention.
Figure 6:
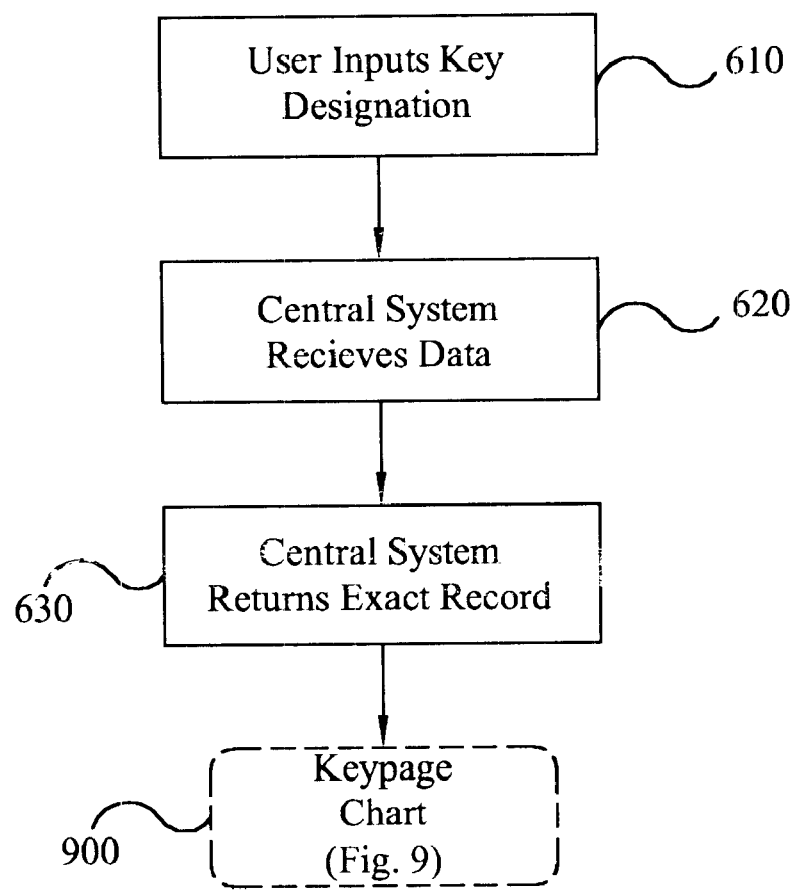
FIG. 6 illustrates searching by key code.
Figure 7A:
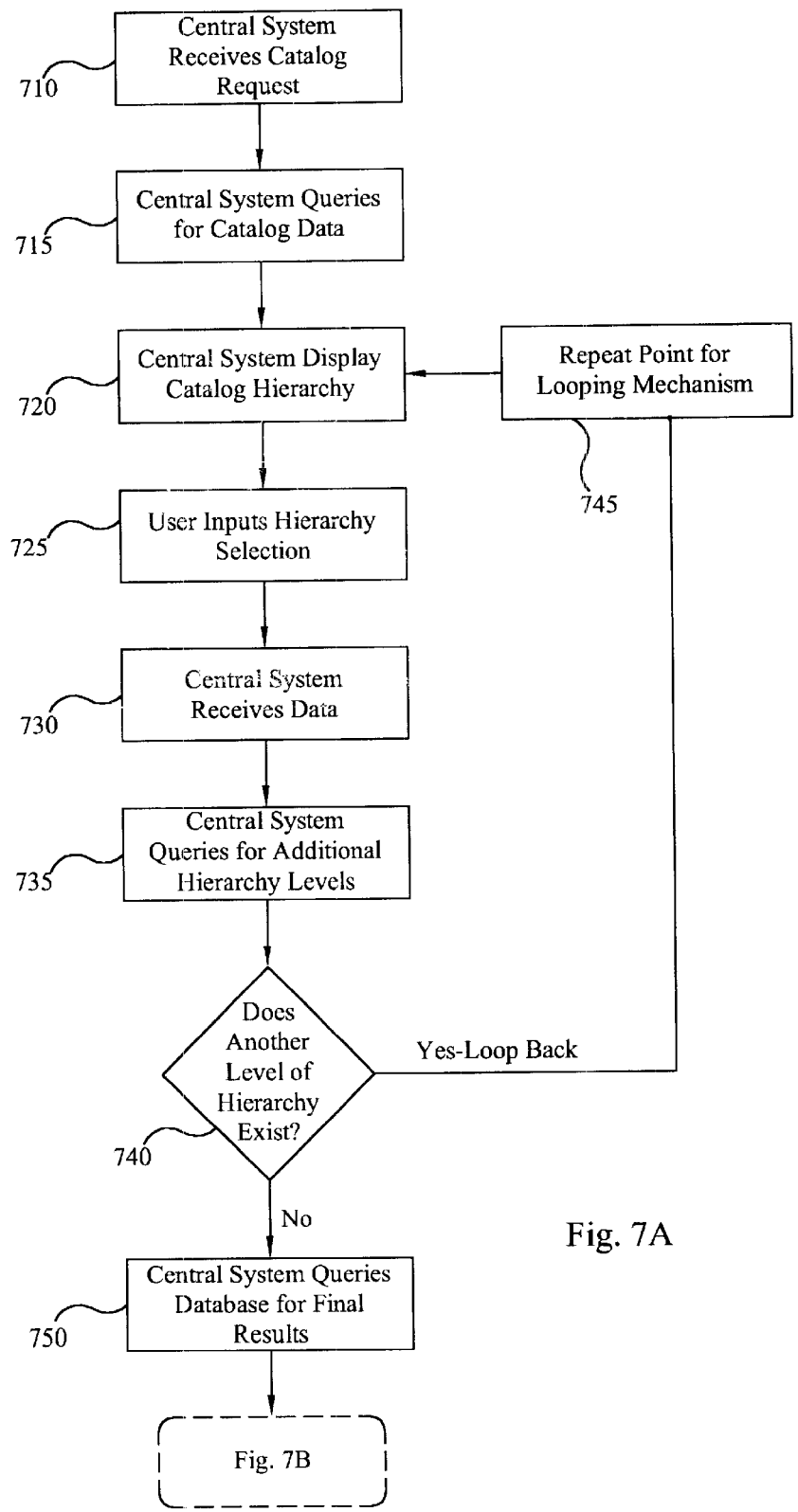
FIGS. 7A and 7B illustrate searching by category.
Figure 7B:
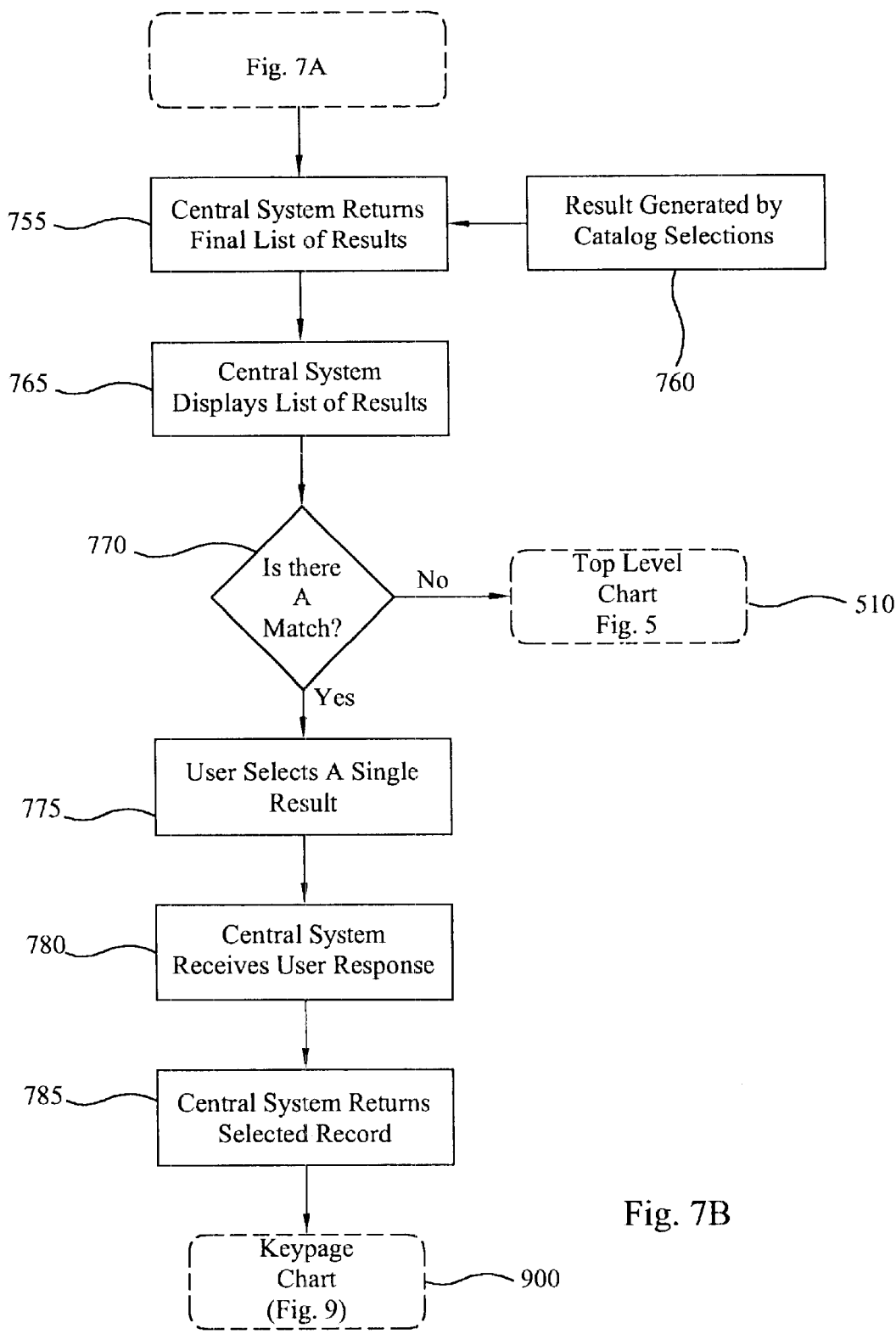

If user 110 has no key code yet, or if a key code does not exist for the product user 110 seeks, he may search by keyword string or category. FIGS. 7A and 7B demonstrate how user 110 searches by category 530. Selecting menu 530 causes controller 200 to retrieve sp 715 and display 720 catalog data of the highest hierarchical level available. User 110 sequentially selects subcategories and controller 200 retrieves 740 and displays them sp 745 until the lowest level available 755 (FIG. 7B) is reached. There, user 110 selects 770 a key code or returns to initial search menu 510. If a key code of interest appears, user 110 makes his selection, whereupon he is linked 775 to the same point 910 (FIG. 9) he would have come to if he had the key code initially (FIG. 5).

Figure 8:
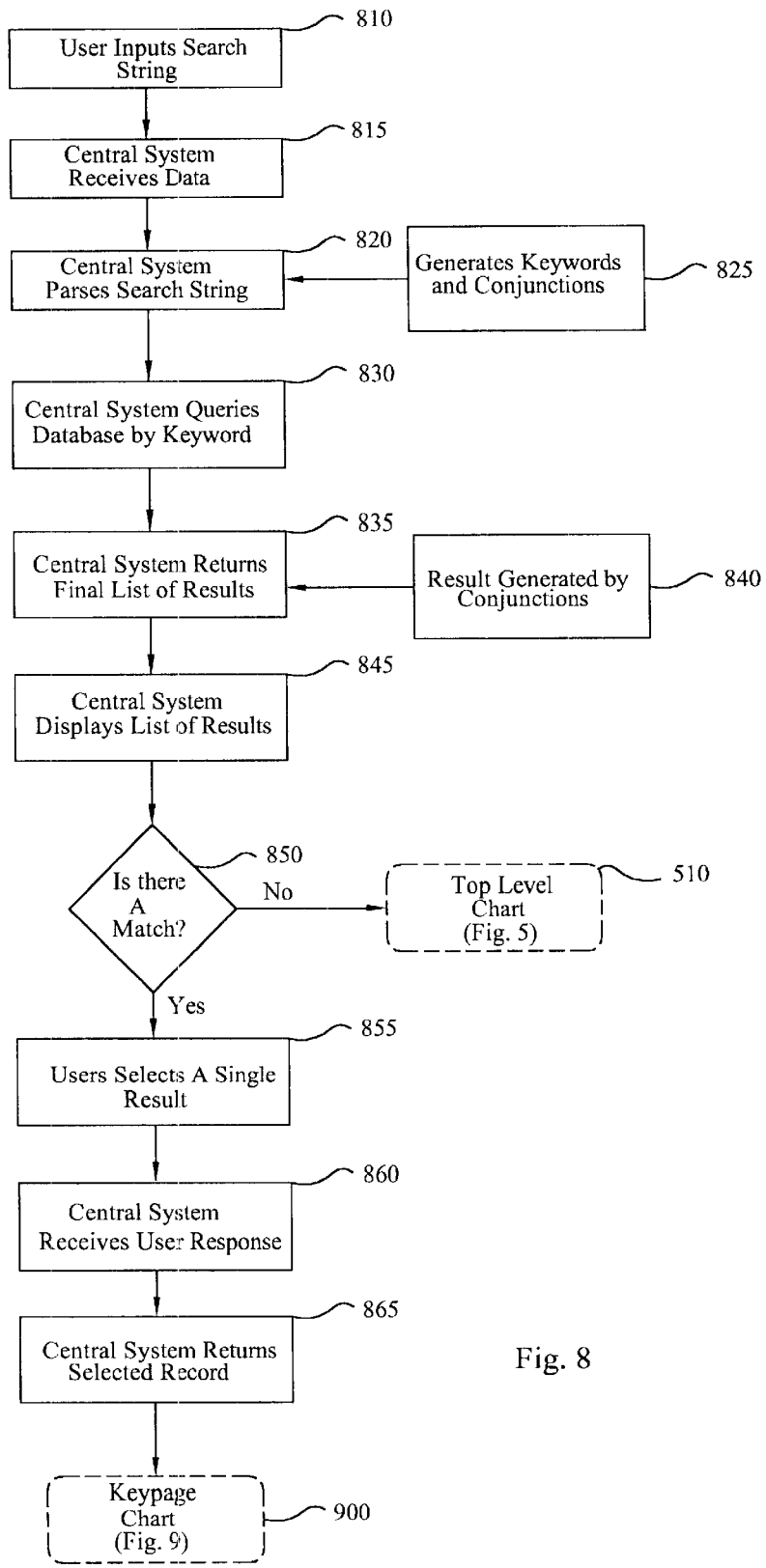
FIG. 8 illustrates searching by boolean keyword strings.

A similar sequence of events occurs in FIG. 8 where user 110 searches by keyword. Selecting menu 540 gives user 110 a space in which to enter a keyword string. User 110 inputs two or more words in a string and requests the search at step 810. One having ordinary skill in the art will recognize that boolean search routines are known in the art, including those sometimes known as "natural language" routines which convert English language sentences into meta words and conjunctions automatically. Use of any such routines is considered to fall within the spirit and scope of the present invention. Controller 200 thereby receives the string 815, parses it into keywords 825, generates conjunctions 840 (i.e. AND or OR boolean logic) and generates and displays a list of results 845. User 110 then may select one of the results 855 or return to the search selection menu 510. If user 110 selects one of the resulting items, controller 200 retrieves the record 865 and any associated information 900.

The present invention thus provides for users 110 and suppliers 120 a clearing house where key codes link them together conveniently. For example, suppliers 120 may imprint their key codes directly on their products, embed them in program files and associate them with product names through promotional materials and the like. Users 110 then seeking upgrades, add-ons or replacement parts may log onto controller 200 and gain immediate access to the latest information about the product from which user 110 obtained the key code, including threads to later updates, revisions and accessories, as well as associated goods related through similar key codes.

A good example is the release of hardware by vendors that includes diskettes or CDROM's with device drivers to make the hardware run correctly. Many times after the release of these drivers, errors are found in them and it becomes necessary to replace them. For purchasers who bought prior to the upgrade, however, access to the replacements often is inconvenient. Using a key code printed on the original diskette, however, user 110 who bought the hardware can link through controller 200 directly to the hardware supplier 120's web site where such upgrades are available for downloading.

Product inventory applications presents an example where user 110 frequently needs to communicate with a vendor for ordering products. Using a key code on such products, as contemplated by the present invention, it might be entirely transparent to user 110 that he enters controller 200 and links therefrom to a supplier 120's web site. In such case, user 110 already may have software resident on his computer which links him directly through to the appropriate supplier 120 and even through supplier 120's web site to the location therein where availability and ordering information for the particular product is found. Central controller 200 will serve as a clearing house for such links, however, by maintaining the URLs of suppliers currently carrying the product being sought. Alternately, user 110 may log onto controller 200 and conduct a search by alternate means.

While the invention has been particularly shown and described with reference to a preferred embodiment, it will be understood by those skilled in the art that various changes in form and detail may be made therein without departing from the spirit and scope of the invention. For example, though the present invention has been described as dependent upon computer network 100, it could be implemented entirely with a paper system, whereby key codes are generated by human intervention and communication is achieved using voice or even mail media. The key code system still would provide the advantages of threading like products and accessories together in a visually intelligible system adapted to maximize information available to users 110.

I claim:

1. A method for creating a standardized computer file code from a file name, the method comprising the steps of
   (1) generating a core term from the file name;
   (2) assigning a file type identifier to the core term; and
   (3) applying a selected version identifier to the core term by executing the following steps:
      (a) contrasting the core term to a version number database of previously standardized core terms to determine if a previous highest version number for the core term exists; then either
         (i) setting the selected version identifier equal to said previous highest version number if said previous highest version number exists; or
         (ii) setting the selected version identifier to zero if said previous highest version number does not exist; then
      (b) incrementing the selected version identifier by one; then
      (c) appending the selected version identifier to the core term.

2. The method of claim 1 wherein the generating step (1) further comprising the steps of
   (a) removing all characters of one or more predetermined character types from the file name; and then
   (b) truncating all remaining characters to a predetermined maximum character quantity.

3. The method of claim 2 wherein the predetermined character types comprise all non-alphabetic characters.

4. The method of claim 2 wherein the removing step (a) comprising the steps of
   isolating all alphabetic and numeric characters; and
   deleting any remaining characters from the core term.

5. The method of claim 1 wherein the assigning step (2) comprising the steps of
   (a) selecting the file type identifier from a database of available file type identifiers; and
   (b) appending the selected file type identifier as a prefix to the core term.

6. The method of claim 1 wherein the assigning step (2) comprising the steps of
   (a) interactively offering a user a selection of file type identifiers from a database of existing file type identifiers; and (b) interactively prompting the user to select an existing file type identifier or to select a new file type identifier of the user's own creation; then (b) appending the selected file type identifier as a prefix to the core term.

7. A method for creating a standardized file code from a file name, the method comprising the steps of
   (1) generating a core term from the file name by:
      (a) removing all characters of one or more predetermined character types from the file name; and then
      (b) truncating all remaining characters to a predetermined maximum character quantity;
      (c) contrasting the remaining character quantity with a predetermined minimum; and
      (d) supplying additional characters until the remaining character quantity equals or exceeds the predetermined minimum;
   (2) assigning a file type identifier to the core term; and
   (3) applying a selected version identifier to the core term.

8. The method of claim 7 wherein the supplying step (d) comprises
   interactively prompting a user for said additional characters.

9. The method of claim 7 wherein the supplying step (d) comprises
   randomly selecting said additional characters from a base-36 list of characters.

10. The method of claim 7 wherein the supplying step (d) comprises
   repeating one or more characters comprising the file type identifier.

11. A centralized file location system comprising
a central controller having
   user access means for coupling a user to the central controller;
   data storage means;
   a central processing unit;
   software means for programming the central processing unit to
      receive a record containing a file name, a file type, a file location address, and a
      description of the file;
      generate a unique, standardized file code from the file name and file type, the file code having
         a prefix based on a category name for the file common to other similar files;
         a core code derived from a name for the file; and
         a version number for each key code distinguishing it from others having the same prefix and core code; and
      associate the file code with the record in a database on the data storage means by
      identifying related files by their prefix and core code; and
      grouping the related files by key codes in the database;
   search engine means for searching the database by file type, file code and keyword to locate and display the file location address; and
   linking means for connecting the user to the file location address to access the file.

12. The centralized file location system of claim 11 wherein the user access means comprises
   a monitor and keyboard coupled to the central controller.

13. The centralized file location system of claim 11 wherein the user access means comprises
   a server providing a gateway between the central processor unit and a network; and
   at least one user terminal coupled to the server through the network.

14. The centralized file location system of claim 11 wherein the file location address comprises
   a uniform resource locator defining a network address where the file may be found.

15. The centralized file location system of claim 11 wherein the linking means comprises
   a server providing a gateway between the central processor unit and a network; and
   file maintenance means coupled to the server through the network.

16. The centralized file location system of claim 15 wherein the file maintenance means comprises
   a file maintenance controller having
      a central processing unit;
      a server coupled to the network; and
      data storage means;
   software means for programming the central processing unit to
      store the file;
      receive file access requests from the network; and
      provide access to the file;
   a second server providing a gateway between the network and a file maintenance controller; and
   a plurality of user access means coupled to the server through the network.

17. A method for creating a standardized computer file code from a file name, the method comprising the steps of
   (1) generating a core term from the file name by
      (a) removing all characters of a predetermined type from the file name; then
      (b) truncating all remaining characters to a predetermined character maximum; then
      (c) contrasting the remaining character quantity against a predetermined minimum; and
      (d) supplying additional characters until the remaining character quantity equals or exceeds the predetermined minimum; then
   (2) assigning a file type identifier to the core term by
      (a) selecting the file type identifier having at least two alphabetic characters; and
      (b) appending the selected file type identifier as a prefix to the core term; and
   (3) applying a version identifier to the core term by
      (a) contrasting the core term to a database of previously standardized core terms;
      (b) determining the latest version number of the core term; then
      (c) incrementing the latest version number by one; and then
      (d) appending the incremented version number to the core term as a suffix.

18. A method for cataloging computer files for Internet access comprising the steps of
   (A) receiving a plurality of records each containing information about a file type, name and uniform resource locator;
   (B) sorting the records by file type; and
   (C) assigning a standardized file code to each record by
      (a) generating a core term from the file name by
         (i) removing all characters of a predetermined type from the file name; and then (ii) truncating all remaining characters to a predetermined character maximum;
(b) assigning a file type identifier to the core term by
(i) selecting the file type identifier from a database of available file type identifiers; and
(ii) appending the selected file type identifier as a prefix to the core term; and
(c) applying a version identifier to the core term by
(i) contrasting the core term to a database of previously standardized core terms;
(ii) determining the latest version number of the core term; then
(iii) incrementing the latest version number by one; and then
(iv) appending the incremented version number to the core term.

19. A method for indexing computer files such that locating one file locates others related thereto, the method comprising the steps of
(1) generating a unique key code for each file, the key code having
a prefix based on a category name for the file common to other similar files;
a core code derived from a name for the file; and
a version number; then
(2) associating related files in a database according to their key codes by
identifying related files by their prefix and core code; and
grouping the related files by key codes in the database;
(3) providing search means for searching the database to locate at least one of said key codes; and
(4) providing display means for displaying associated key codes to a searcher.

20. A method for indexing products whereby a plurality of related products may be located by reference to a first product, the method comprising the steps of
(1) generating unique key codes for each of the products, the key codes having
a prefix based on a category name for the related products;
a core code derived from a name for each product; and
a version number suffix; then
(2) associating in a database the related products with the first product according to similarities in the key codes; and
(3) providing search means for searching the database to locate at least one of said key codes; and
(4) providing display means for displaying together to a searcher associated key codes and the respective products.

21. The method of claim 20 method wherein the associating step (2) comprises
identifying related products by their prefix and core code; and
grouping the related files by their key codes in the database.

22. A method for indexing products whereby a plurality of related products may be located by reference to a first product, the method comprising the steps of
(1) generating unique key codes for each of the products; then
(2) associating in a database the related products with the first product according to similarities in the key codes by
identifying related products by a prefix and a core code; and
grouping the related products by their key codes in the database;
(3) providing search means for searching the database to locate at least one of said key codes; and
(4) providing display means for displaying together to a searcher associated key codes and the respective products.

23. The method of claim 22, wherein
the prefix is based on a category name for the first product common to the related products;
the core code is derived from a name for the product; and
a version number is appended to the key code for distinguishing it from others having the same prefix and core code.

* * * * *